(No Model.)

E. HUTSON.
Cotton Chopper.

No. 239,790.            Patented April 5, 1881.

Witnesses:
Frank M. Burnham
J. J. McCarthy

Inventor:
Elisha Hutson
By Alexander & Mason
Attys.

UNITED STATES PATENT OFFICE.

ELISHA HUTSON, OF LA FAYETTE, ALABAMA.

COTTON-CHOPPER.

SPECIFICATION forming part of Letters Patent No. 239,790, dated April 5, 1881.

Application filed August 24, 1880. (No model.)

*To all whom it may concern:*

Be it known that I, ELISHA HUTSON, of La Fayette, in the county of Chambers, and in the State of Alabama, have invented certain new and useful Improvements in Cotton-Choppers; and I do hereby declare that the following is a full, clear, and exact description thereof, reference being had to the accompanying drawings, and to the letters of reference marked thereon, making a part of this specification.

This invention has for its object to provide an improved cotton-chopper which will be inexpensive in construction, which can be conveniently attached to and used in connection with an ordinary plow-stock, and which will cut the cotton out of the row in which it grows and drop what is cut between the knives or hoes of the chopper. These objects I attain by the apparatus illustrated in the accompanying drawings, in which—

Figure 1:
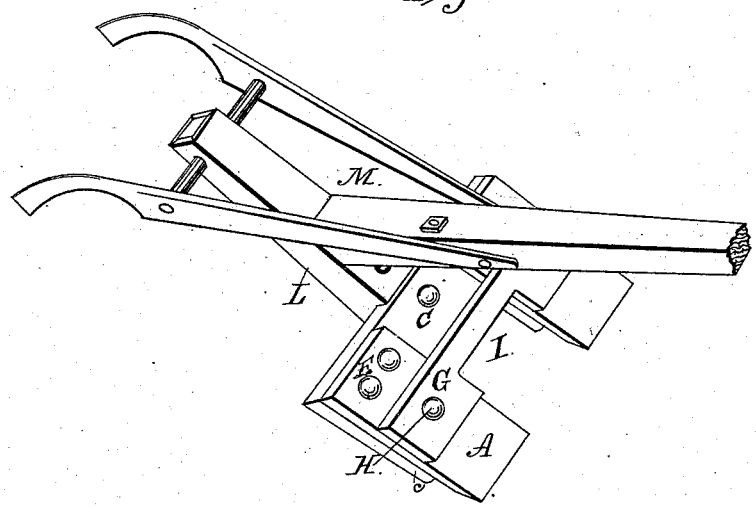
Figure 2:
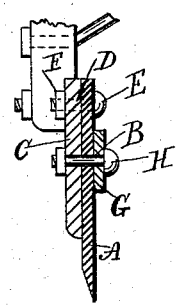
Figure 3:
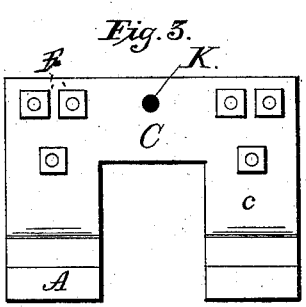
Figure 4:
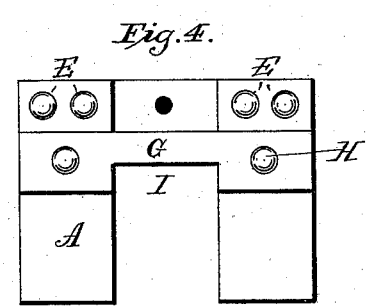

Figure 1 represents a perspective view of my improved cotton-chopper, showing the same attached to an ordinary plow-stock. Fig. 2 represents a view, partly in elevation and partly in section, showing the chopping-hoes attached to the plow-stock. Fig. 3 indicates a detached bottom view of the cotton-chopping devices, and Fig. 4 a detached top view of the same.

The letter A indicates the blades or hoes of my improved cotton-chopping hoes or blades, which are sharpened to a cutting-edge at their forward ends. The said hoes are perforated, as indicated by the letter B, and are adjustably secured to a metallic support or cross-bar, C, which is provided with forward extensions c, which form seats for the respective hoes. The said cross-bar is formed with apertures D, by means of which the plates may be adjusted laterally, and secured by the bolts E, which are provided with screw-nuts F, the adjustment being effected by moving the plates laterally, so as to bring the apertures at either side of the plates in line with the apertures in the cross-bar, and passing the bolts through said apertures and securing them by means of the nuts.

The letter G indicates a wooden or metallic guard-bar, which is secured above the chopping-knives by means of bolts H. The said bar is cut away at the center, as indicated by the letter I, so as not to interfere with the space between the chopping-knives and prevent the cotton from being properly thrown between them. The forward edges of the wooden guard extend to about within an inch of the cutting-edges of the knives, the said guard preventing the knives from entering the ground too far and cutting too low.

The cross-bar C is provided with an aperture, K, by means of which it may be secured to the end of the beam L of the plow-stock M, which is of the ordinary or any approved construction.

The apparatus is drawn by horses and guided by hand in the ordinary manner.

Having thus fully described my invention, what I claim, and desire to secure by Letters Patent, is—

The combination, in a cotton-chopper, of the blade-supporting cross-bar C, provided with downward and forward extensions, which form rests for the blades A A, the bolts E E, which secure the blades to the bar, the guard G, provided with similar extensions, and the screw-bolts H, whereby the guard is clamped upon the blades and secured to the cross-bar, substantially as and for the purposes set forth.

In testimony that I claim the foregoing I have hereunto set my hand this 14th day of August, 1880.

ELISHA HUTSON.

Witnesses:
J. J. ROBINSON,
A. D. DENSON.